US008813101B2

(12) United States Patent
Wirfs-Brock et al.

(10) Patent No.: US 8,813,101 B2
(45) Date of Patent: Aug. 19, 2014

(54) SOFTWARE TECHNIQUE TO CORRELATE CONCEPTUALLY SIMILAR ENTITIES

(75) Inventors: Allen Wirfs-Brock, Kirkland, WA (US); Douglas Rosen, Woodinville, WA (US); Ron Cain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1512 days.

(21) Appl. No.: 11/728,995

(22) Filed: Mar. 28, 2007

(65) Prior Publication Data

US 2008/0244624 A1 Oct. 2, 2008

(51) Int. Cl.
*G06F 9/54* (2006.01)
(52) U.S. Cl.
USPC ............ 719/328; 707/791; 707/802; 707/809
(58) Field of Classification Search
None
See application file for complete search history.

(56) References Cited

U.S. PATENT DOCUMENTS

| | | | |
|---|---|---|---|
| 6,487,714 B1* | 11/2002 | Azagury et al. | 717/116 |
| 6,622,136 B2 | 9/2003 | Russell | |
| 6,640,231 B1 | 10/2003 | Andersen et al. | |
| 7,103,593 B2 | 9/2006 | Dean | |
| 7,398,519 B2* | 7/2008 | Arnold et al. | 717/129 |
| 2002/0038303 A1* | 3/2002 | Gelfand | 707/100 |
| 2003/0005412 A1 | 1/2003 | Eanes | |
| 2003/0097588 A1 | 5/2003 | Fischman et al. | |
| 2003/0128214 A1* | 7/2003 | Oglesby et al. | 345/473 |
| 2003/0226109 A1 | 12/2003 | Adamson et al. | |
| 2004/0133414 A1 | 7/2004 | Adamson et al. | |
| 2005/0044527 A1 | 2/2005 | Recinto | |
| 2006/0195476 A1* | 8/2006 | Nori et al. | 707/104.1 |
| 2006/0288326 A1 | 12/2006 | Raymond et al. | |
| 2008/0183725 A1* | 7/2008 | Blakeley et al. | 707/100 |

OTHER PUBLICATIONS

Jose A. Blakeley, The ADO.Net Entity Framework: making the conceptual level real, Dec. 2006, p. 8.*
Belle, Jean-Paul Van, "Towards a Syntactic Signature for Domain Models: Proposed Descriptive Metrics for Visualizing the Entity Fan-out Frequency Distribution", Date: 2002, http:///delivery.acm.org/10.1145/590000/581510/p19-vanbelle.pdf?key1=581510&key2=3156930711&coll=&dl=acm&CFID=15151515&CFTOKEN=6184618.
Peterson, et al., "Mapping a Domain Model and Architecture to a Generic Design", Date: May 1994, ftp://ftp.sei.cmu.edu/pub/documents/94.reports/pdf/tr08.94.pdf.
Mitra, et al., "A Scalable Framework for the Interoperation of Information Sources", http://infolab.stanford.edu/~prasen9/swws-bk.pdf, Proceedings of SWWS'01, The first Semantic Web Working Symposium, Stanford University, California, USA, Jul. 30-Aug. 1, 2001, pp. 317-329.

* cited by examiner

*Primary Examiner* — H S Sough
*Assistant Examiner* — Syed Roni
(74) *Attorney, Agent, or Firm* — Kevin Sullivan; Brian Haslam; Micky Minhas (57) ABSTRACT

Various technologies and techniques are disclosed for providing a framework with a common set of domain-specific entity identifier types that object models representing conceptually similar entities from a domain can use to correlate to model-specific object instances. A particular model-specific object instance of a particular one of the object models can be retrieved using a common set of domain-specific entity identifier types. An instance of a particular domain-specific entity identifier type can be retrieved from a corresponding one of the model-specific object instances. One or more extensibility mechanisms allow third parties to extend the set of domain-specific entity identifier types.

20 Claims, 13 Drawing Sheets

```
public interface IModel : IDisposable
{
    IHandle Handle { get; }
    IHandle ParentHandle { get; }
    IHandle GetModelHandle(ModelIdentifier modelIdentifier,
        Type modelType);
    ModelIdentifier GetModelIdentifier(Type modelIdentifierType);
}
```

```
public interface IHandleModelService
{
    IHandle GetModelHandle(
        ModelIdentifier modelIdentifier,
        Type modelType,
        IHandle parentHandle,
        string modelTag);

ModelIdentifier GetModelIdentifier(
        Type modelIdentifierType,
        IHandle modelHandle,
        IHandle parentHandle,
        string modelTag);
}
```

```
public abstract class ModelHandleFactory
{
    public abstract IHandle GetModelHandle(
        Type modelType,
        ModelIdentifier identifier,
        IHandle parentHandle);
}
```

FIG. 12

```
public abstract class ModelIdentifierFactory
{
    public abstract ModelIdentifier GetModelIdentifier(
        Type modelIdentifierType,
        IHandle model,
        IHandle parentModel);
}
```

SOFTWARE TECHNIQUE TO CORRELATE CONCEPTUALLY SIMILAR ENTITIES

BACKGROUND

In the world of computer programming, object models are application programming interfaces (APIs) and/or classes that are used to represent specific types of information relating to some problem domain. Multiple object models frequently refer to the same domain of conceptual entity using their own internal representation. Individual object models are typically designed to facilitate some particular style of data access or algorithmic processing. Take, for example, a method object called "Method A" that represents a specific function in some computer program. There might be a performance analysis tool that stores performance data over a period of time for a certain method object called "Method A". There might be a debugger that also stores debugging information for a method object called "Method A". There might also be source code written using a software development program that contains the actual implementation for "Method A". Each program uses its own model-specific object instances for referring to the same conceptual entity called "Method A".

A problem arises when a process wants to correlate the different objects corresponding to "Method A" in a meaningful fashion. One approach that is sometimes taken is to independently recognize that they are referring to the same conceptual entity by invoking model-dependent application programming interfaces to retrieve the entities using model-dependent data extracted from the other model. For example, suppose that a debugger wants to use performance analysis data for a comparison. The debugger could ask the performance analysis tool for the data. The performance analysis tool would then analyze the performance record from the performance model, extract a method signature, recompose the method signature into a format that is acceptable to the debugger, and pass that information to the debugger. This solution is tedious and also only works if the object models make the data public and provide mechanisms for the entity data to actually be requested. When the data is actually private, or the object model does not expose a way of accessing that data, a client may not be able to correlate these models at all.

SUMMARY

Various technologies and techniques are disclosed for providing a framework with a common set of domain-specific entity identifier types that object models representing conceptually similar entities from a domain can use to correlate to model-specific object instances. A particular model-specific object instance of a particular one of the object models can be retrieved using a common set of domain-specific entity identifier types. An instance of a particular domain-specific entity identifier type can be retrieved from a corresponding one of the model-specific object instances. One or more extensibility mechanisms allow third parties to extend the set of domain-specific entity identifier types.

In one implementation, an application programming interface is provided with an abstract entity identifier class, with domain-specific entity identifier types being required to derive from the abstract entity identifier class, thereby allowing object models representing a conceptually similar entity to use the domain-specific entity identifier types to correlate model-specific object instances.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a framework application that allows conceptually similar entities to be correlated, but the system also serves other purposes in addition to these. In one implementation, one or more of the techniques described herein can be implemented as features within a framework program such as MICROSOFT®.NET Framework, or from any other type of program or service that provides platforms for building applications. In another implementation, one or more of the techniques described herein are implemented as features with other applications that deal with object models each having their own manner of referencing the same conceptual entity.

In one implementation, a framework is provided that has application programming interfaces (APIs) for allowing conceptually similar entities to be correlated. The framework has a common set of domain-specific entity identifier types that object models representing conceptually similar entities from a domain can use to correlate to model-specific object instances. The term "domain-specific entity identifier types" as used herein is meant to include identifiers implemented in an abstract class for the purpose of describing some conceptual entity in a particular domain. The term "model-specific object instance" is meant to include an object instance obtained from some specific model instance. Take, for example, the scenario that was previously described in the background. Suppose there is a performance analysis tool that stores performance data over a period of time for a certain method object called "Method A". Suppose also that there is a debugger that also stores debugging information for a certain method object called "Method A". Suppose also that there is source code written using a software development program that contains the actual implementation for "Method A". Each program uses its own model-specific object instances for referring to the same conceptual entity called "Method A". If some process wants to see the performance and debugger data for "Method A", the common set of domain-specific entity identifier types can be used in order to correlate these object instances together in a meaningful fashion.

Figure 1:
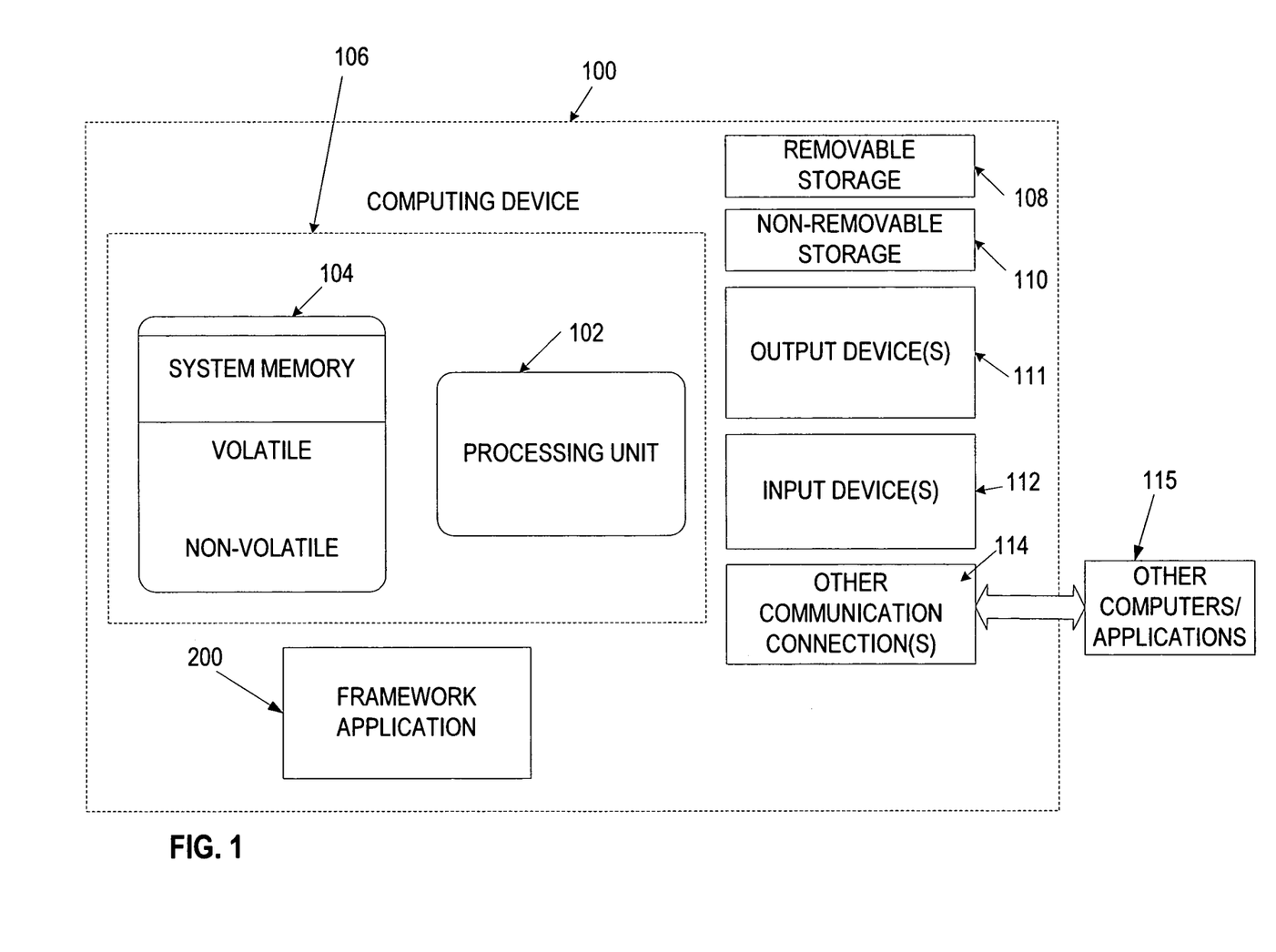
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes framework application 200. Framework application 200 will be described in further detail in FIG. 2.

Figure 2:
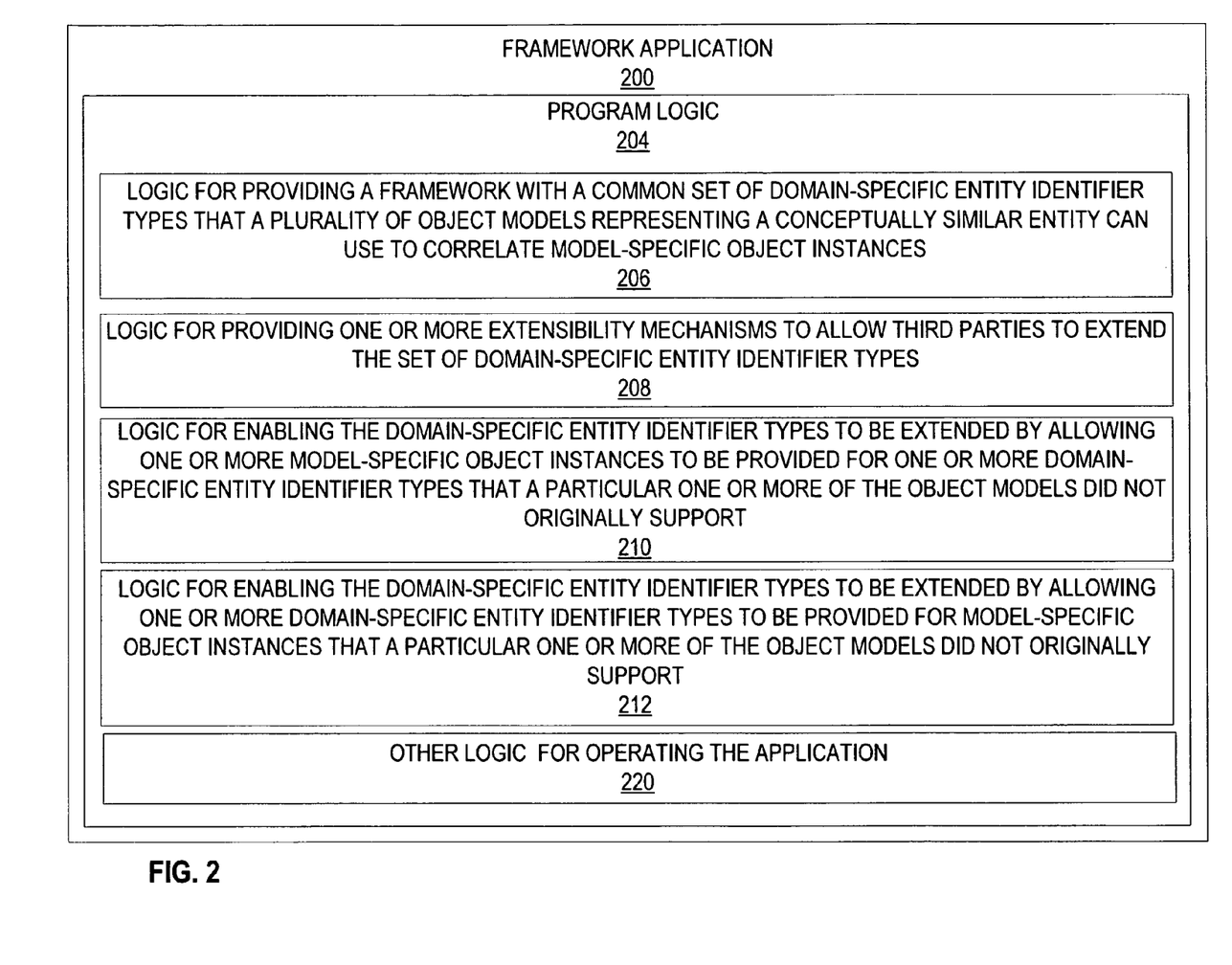
FIG. 2 is a diagrammatic view of a framework application of one implementation operating on the computer system of FIG. 1.

Turning now to FIG. 2 with continued reference to FIG. 1, a framework application 200 operating on computing device 100 is illustrated. Framework application 200 is one of the application programs that reside on computing device 100. However, it will be understood that framework application 200 can alternatively or additionally be embodied as computer-executable instructions on one or more computers and/or in different variations than shown on FIG. 1. Alternatively or additionally, one or more parts of framework application 200 can be part of system memory 104, on other computers and/or applications 115, or other such variations as would occur to one in the computer software art.

Framework application 200 includes program logic 204, which is responsible for carrying out some or all of the techniques described herein. Program logic 204 includes logic for providing a framework with a common set of domain-specific entity identifier types that a plurality of object models representing a conceptually similar entity can use to correlate model-specific object instances 206; logic for providing one or more extensibility mechanisms to allow third parties to extend the set of domain-specific entity identifiers types 208; logic for enabling the domain-specific entity identifier types to be extended by allowing one or more model-specific object instances to be provided for one or more domain-specific entity identifier types that a particular one or more of the object models did not originally support 210; logic for enabling the domain-specific entity identifier types to be extended by allowing one or more domain-specific entity identifier types to be provided for model-specific object instances that a particular one or more of the object models did not originally support 212; and other logic for operating the application 220. In one implementation, program logic 204 is operable to be called programmatically from another program, such as using a single call to a procedure in program logic 204.

Figure 3:
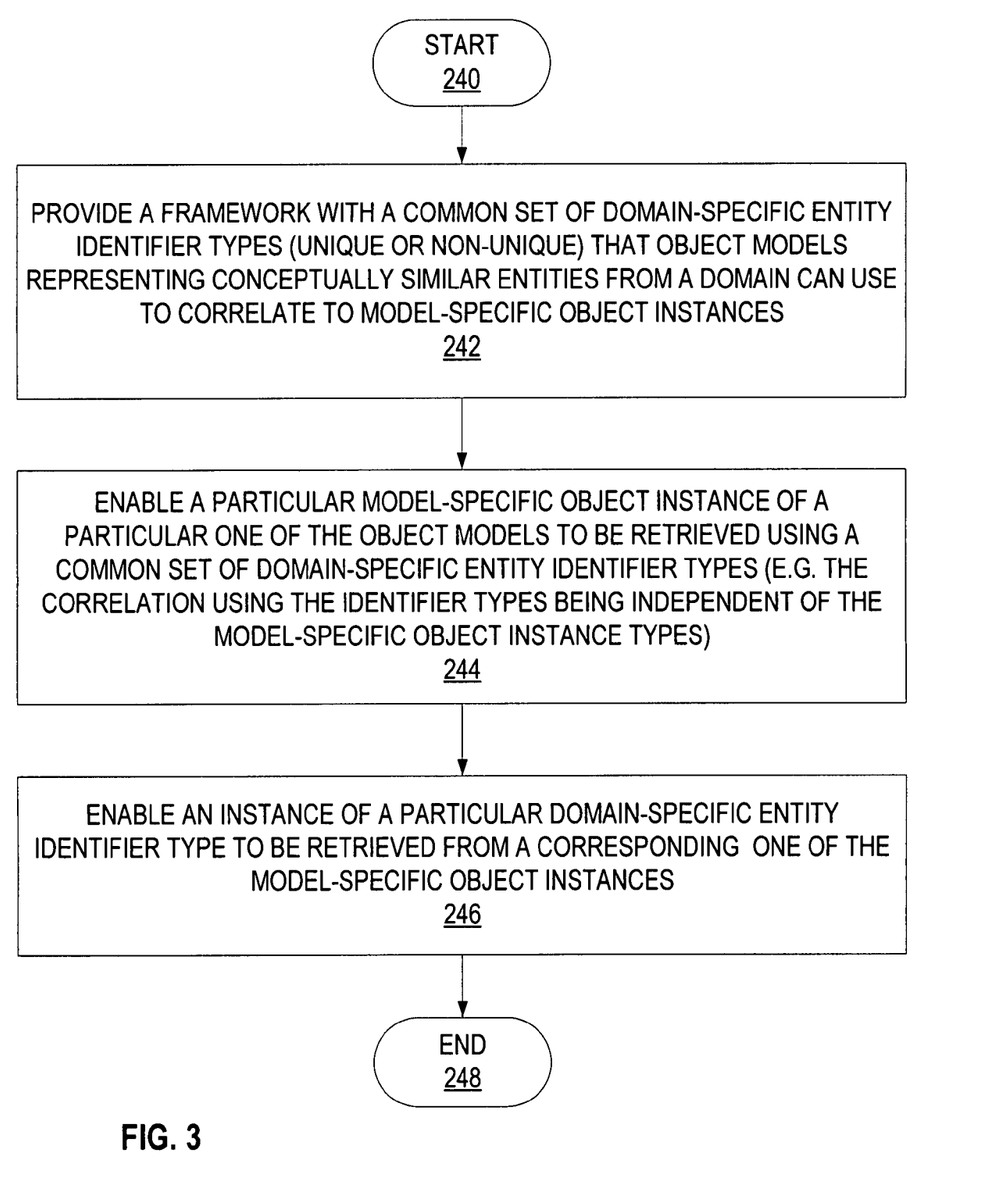
FIG. 3 is a high-level process flow diagram for one implementation of the system of FIG. 1.

Turning now to FIGS. 3-8 with continued reference to FIGS. 1-2, the stages for implementing one or more implementations of framework application 200 are described in further detail. FIG. 3 is a high level process flow diagram for framework application 200. In one form, the process of FIG. 3 is at least partially implemented in the operating logic of computing device 100. The process begins at start point 240 with providing a framework with a common set of domain-specific entity identifier types (unique or non-unique) that object models representing conceptually similar entities from a domain can use to correlate to model-specific object instances (stage 242). The framework allows a particular model-specific object instance of a particular one of the object models to be retrieved using a common set of domain-specific entity identifier types (stage 244). In one implementation, the correlation using the identifier types is independent of the model-specific object instance types (stage 244). An instance of a particular domain-specific entity identifier type can be retrieved from a corresponding one of the model-specific object instances (stage 246). The process ends at end point 248.

Figure 4:
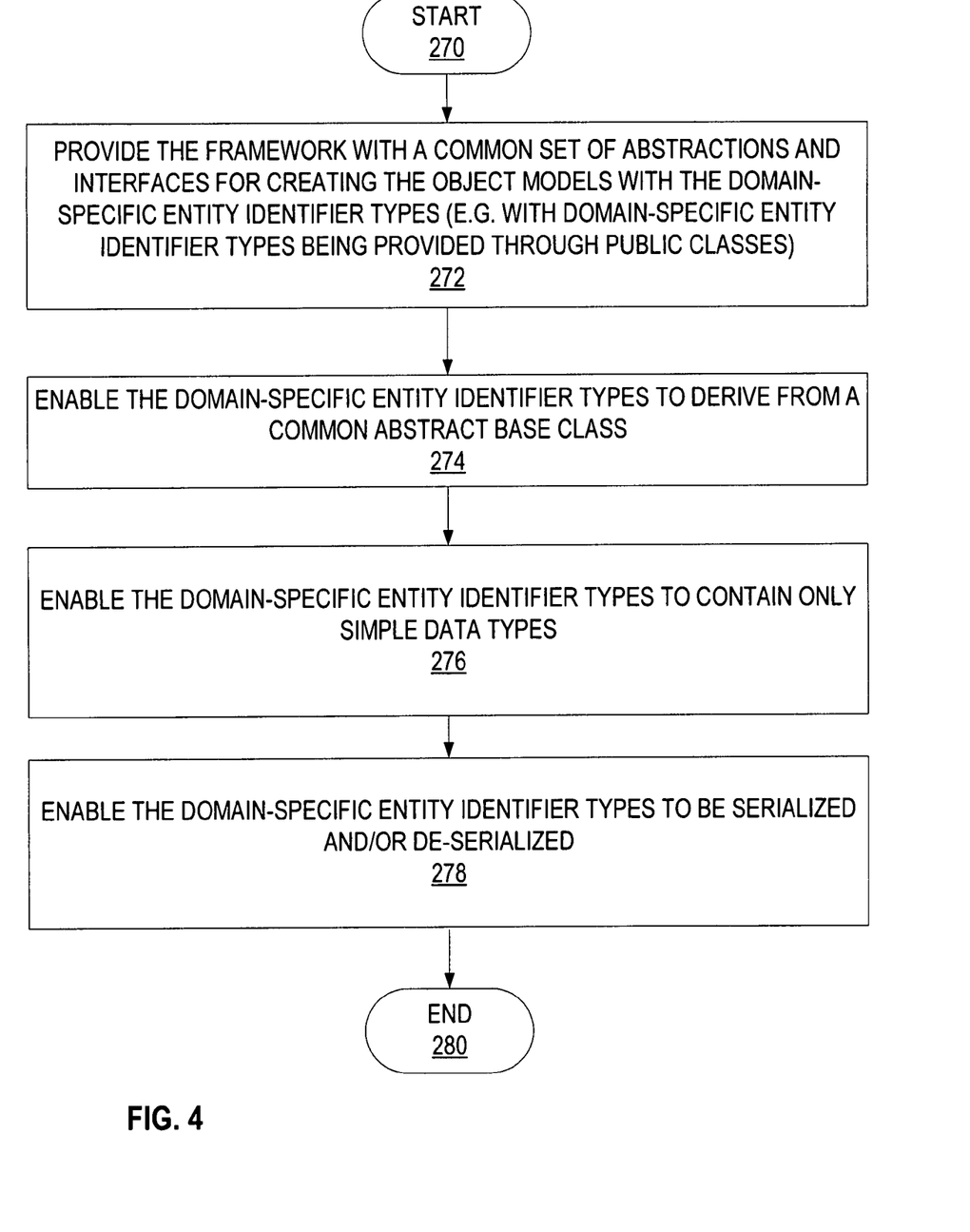
FIG. 4 is a process flow diagram for one implementation of the system of FIG. 1 illustrating the stages involved in providing a framework with a common set of abstractions for creating object models with domain-specific entity identifier types.

FIG. 4 illustrates one implementation of the stages involved in providing a framework with a common set of abstractions for creating object models with domain-specific entity identifier types. In one form, the process of FIG. 4 is at least partially implemented in the operating logic of computing device 100. While FIG. 4 is described as a series of stages, it will be appreciated that no particular order is intended. Further, it will be appreciated that fewer, all, and/or additional features can also be provided by framework application 200 than those described in FIG. 4 and other figures. The process begins at start point 270 with providing the framework with a common set of abstractions and interfaces for creating the object models with the domain-specific entity identifier types (e.g. with domain-specific entity identifier types being provided through public classes) (stage 272). Using the framework, the domain-specific entity identifier types derive from a common abstract base class (stage 274). In one implementation, the domain-specific entity identifier types contain only simple data types (stage 276). The domain-specific entity identifier types can be serialized and/or de-serialized (stage 278), such as for transfer among computers and/or for easy storage on a file system. The process ends at end point 280.

Figure 5:
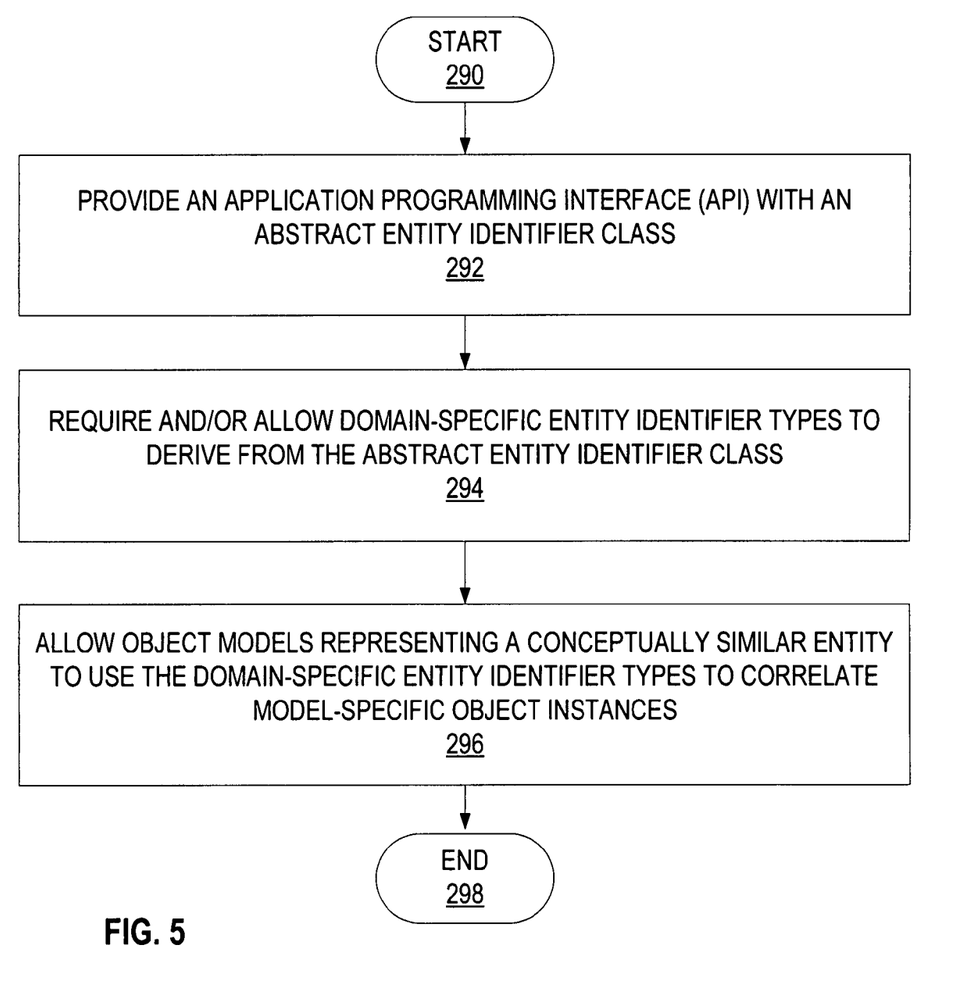
FIG. 5 is a process flow diagram for one implementation of the system of FIG. 1 illustrating the stages involved in providing an application programming interface for allowing correlation among conceptually similar entities.

FIG. 5 illustrates one implementation of the stages involved in providing an application programming interface for allowing correlation among conceptually similar entities. In one form, the process of FIG. 5 is at least partially implemented in the operating logic of computing device 100. The process begins at start point 290 with providing an application programming interface (API) with an abstract entity identifier class (stage 292). Domain-specific entity identifier types are required and/or allowed to derive from the abstract entity identifier class (stage 294). Object models representing a conceptually similar entity can use the domain-specific entity identifier types to correlate model-specific object instances (stage 296). The process ends at end point 298.

Figure 6:
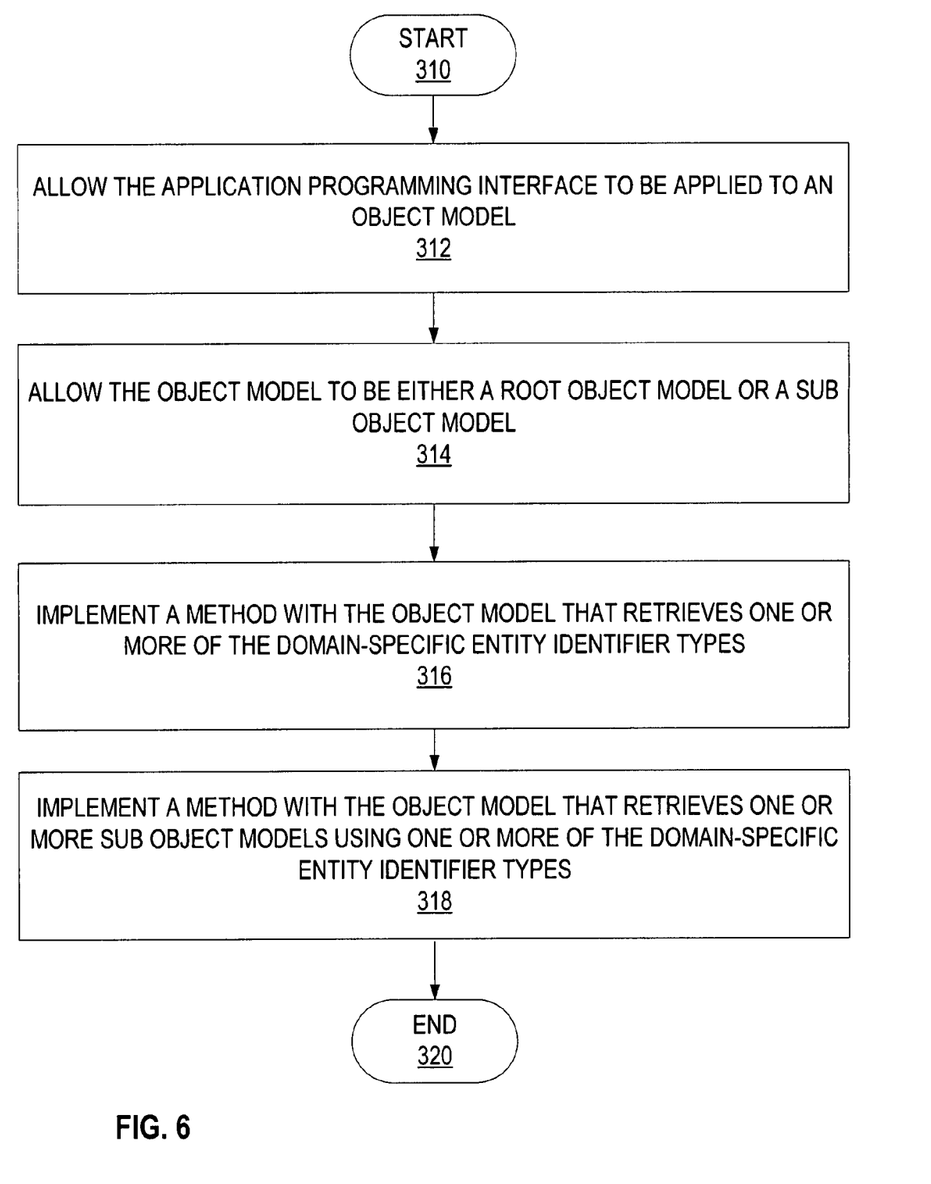
FIG. 6 is a process flow diagram for one implementation of the system of FIG. 1 illustrating the stages involved in using the API described in FIG. 5 with object models.

FIG. 6 illustrates one implementation of the stages involved in using the API described in FIG. 5 with object models. In one form, the process of FIG. 6 is at least partially implemented in the operating logic of computing device 100. The process begins at start point 310 with allowing the application programming interface to be applied to an object model (stage 312). The object model can be either a root object model or a sub object model (stage 314). A method is implemented with the object model that retrieves one or more of the domain-specific entity identifier types (stage 316). A method is implemented with the object model that retrieves one or more sub object models using one or more of the domain-specific entity identifier types (stage 318). The process ends at end point 320.

Figure 7:
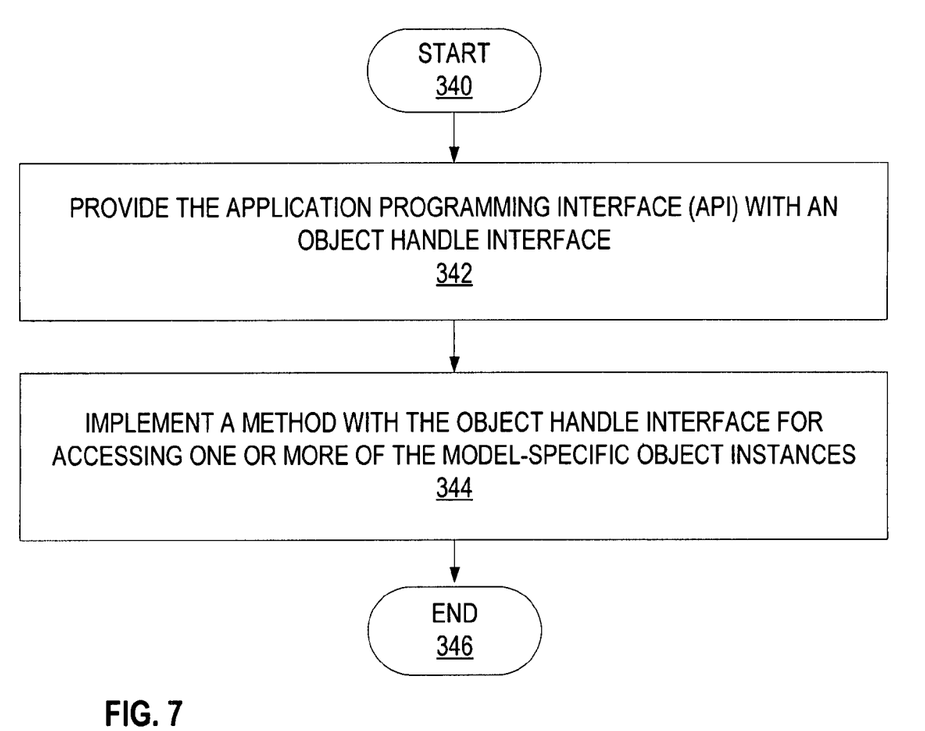
FIG. 7 is a process flow diagram for one implementation of the system of FIG. 1 that illustrates the stages involved in providing the API described in FIG. 5 with an object handle interface.

FIG. 7 illustrates one implementation of the stages involved in providing the API described in FIG. 5 with an object handle interface. In one form, the process of FIG. 7 is at least partially implemented in the operating logic of computing device 100. The process begins at start point 340 with providing the application programming interface (API) with an object handle interface (stage 342). The term "handle" as used herein is meant to include a soft reference to a model-specific object instance. A method is implemented with the object handle interface for accessing one or more of the model-specific object instances (stage 344). The process ends at end point 346.

Figure 8:
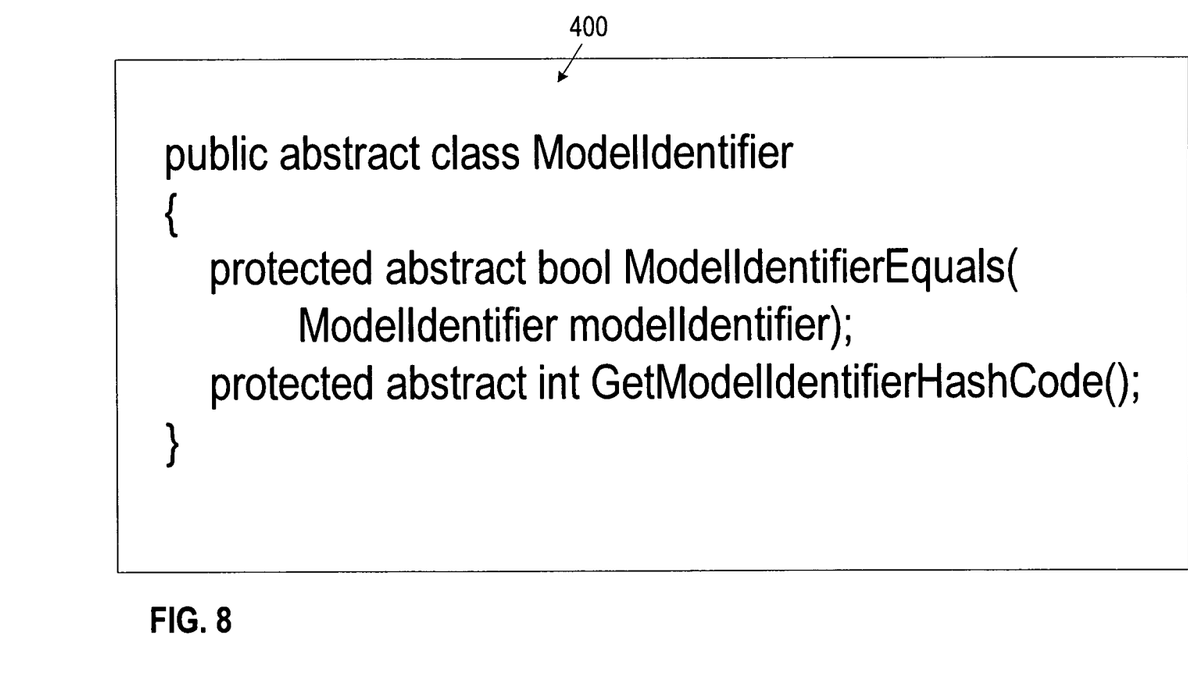
FIG. 8 is a diagram illustrating a ModelIdentifier abstract class of one implementation.

FIGS. 8-13 illustrate exemplary classes and interfaces that can be used for implementing some or all of the techniques discussed in FIG. 1-7 for allowing correlation of conceptually similar entities from multiple object models. It will be appreciated that the classes and interfaces' could be implemented using different names and/or features in alternate implementations. FIG. 8 is a diagram illustrating a ModelIdentifier abstract class 400 of one implementation. Example characteristics of entity identifiers include:

They are simple immutable value objects containing only simple data types     They provide "value equality" semantics so that two instances are equal if their values are equal     They contain no model-dependent information     They can be serialized and de-serialized     They define a data contract so they are not tightly coupled to a particular runtime type In one implementation, all entity identifier classes derive from this common ModelIdentifier abstract base class. They typically offer additional data that a client can specify at instantiation time. Object models typically access these data through public properties exposed by those subclasses.

Figure 9:
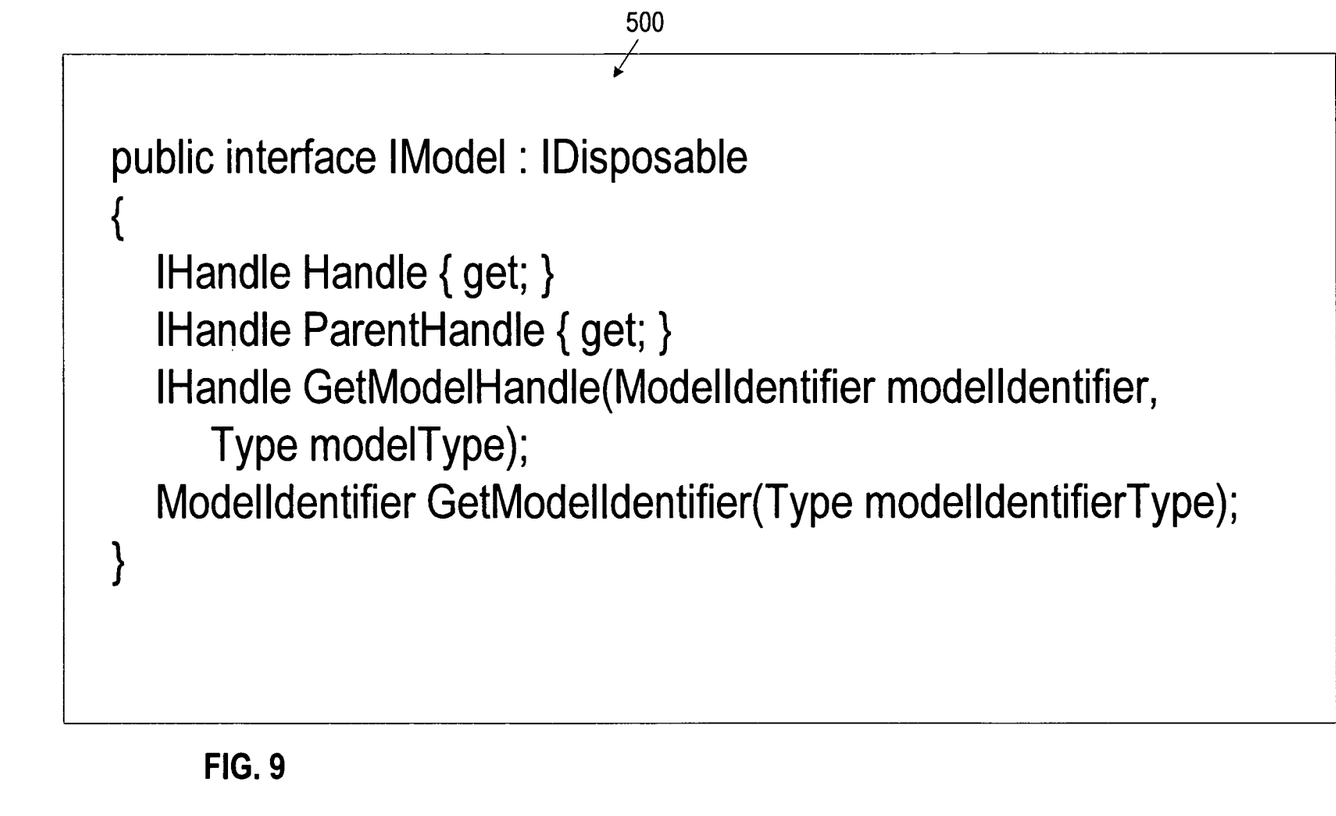
FIG. 9 is a diagram illustrating an IModel type interface of one implementation.

FIG. 9 is a diagram illustrating an IModel type interface 500 of one implementation. In one implementation, object models that wish to support entity identifiers implement this common interface. Example characteristics of the IModel interface are:

An IModel can be either a root model (which has no parent model) or a sub-model (it is the child of another IModel)

It implements a method (e.g. IHandle GetModelHandle) to retrieve those sub-models using entity identifiers (the method returning a model handle to the sub-model).

It implements a method (e.g. ModelIdentifier GetModelIdentifier) to obtain one or more entity identifiers of the requested type.

Figure 10:
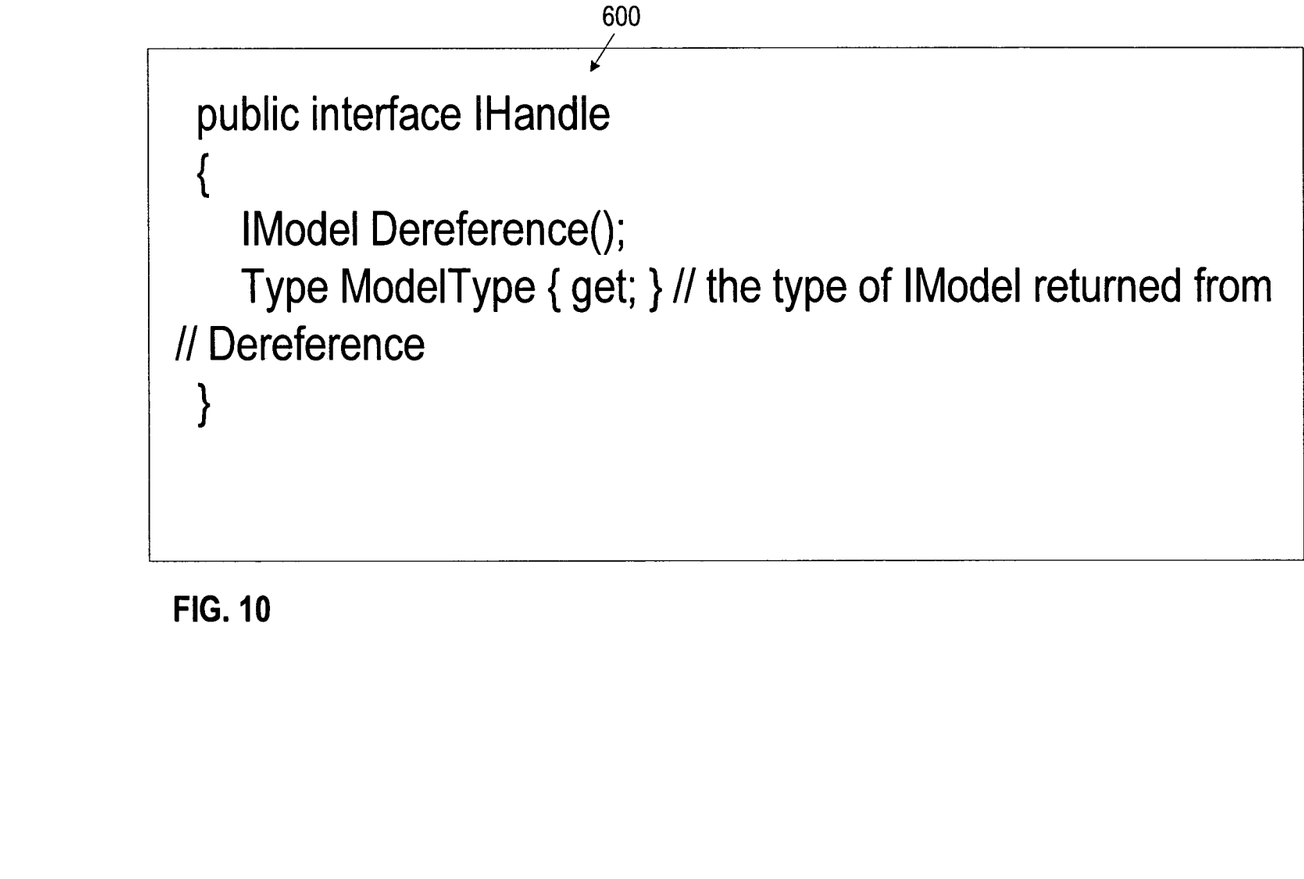
FIG. 10 is a diagram illustrating an IHandle type interface of one implementation.

FIG. 10 is a diagram illustrating an IHandle type interface 600 of one implementation. In one implementation, object models are accessible through model handles that implement the IHandle interface. Example characteristics of a model handle are:

It implements a de-referencing method (IModelDereference) that returns the actual IModel instance to which it logically refers     Model handles are simple immutable value objects     Model handles have "value equality" semantics     Model handles may be serialized and de-serialized     Model handles define a data contract so they do not depend on a specific runtime type An entity identifier is a domain-specific symbolic reference that can be applied to multiple models sharing a set of related entity identifier types, sometimes called an ontology. On the other hand, a model handle is a soft reference to a single model-specific object instance. The model handle abstraction permits tools to refer to entities in other object models in a uniform way. It can also avoid holding any model-specific data objects. When the tool wants to interact with a model object, it obtains it by de-referencing the handle.

Figure 11:
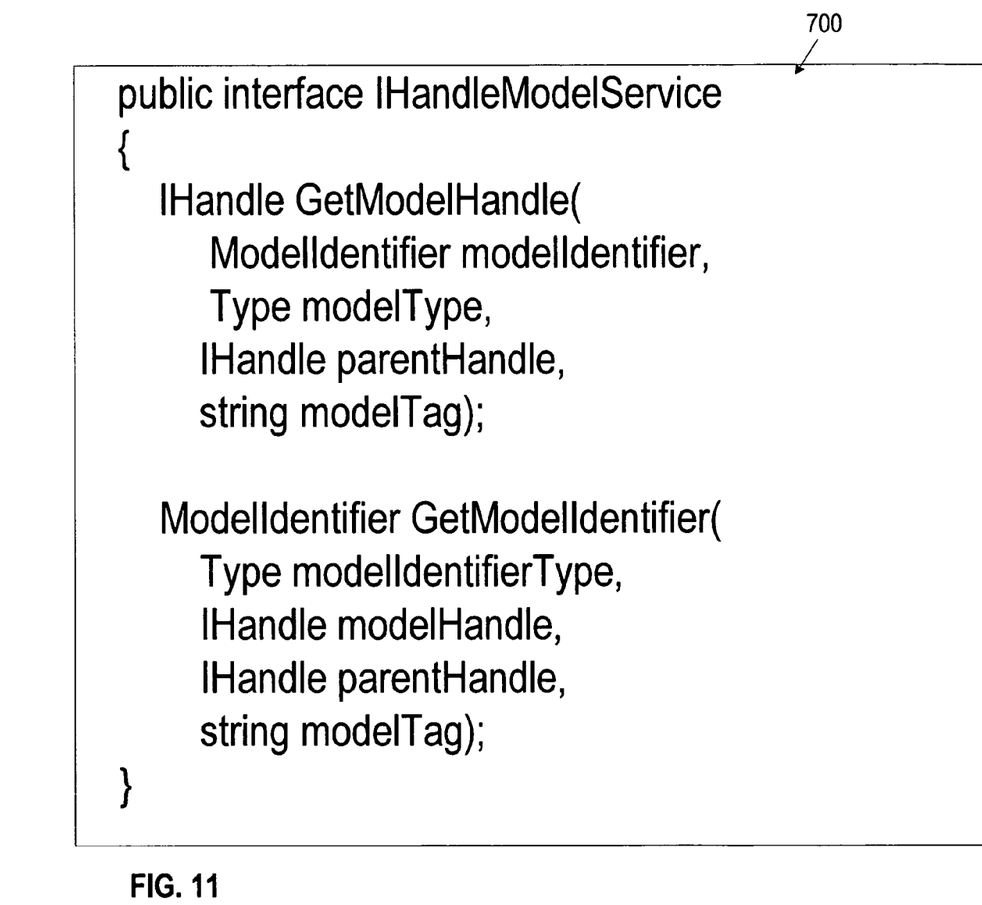
FIG. 11 is a diagram illustrating an IHandleModelService type interface of one implementation.

FIG. 11 is a diagram illustrating an IHandleModelService type interface 700 of one implementation. Authors of object models cannot always know in advance the complete set of entity identifiers they must support. For example, a client may need to correlate two object models, yet neither object model recognizes the other's entity identifiers. An extensibility mechanism is provided in one implementation to allow third parties to extend the set of entity identifiers that a particular object model recognizes. As part of the extensibility mechanism, the IHandleModelService type interface 700 is provided. Clients may ask for a model handle or an entity identifier, and the service will consult its list of known extensions to determine whether the request can be honored.

One implementation of IHandleModelService 700 aggregates all instances of ModelHandleFactory (800 on FIG. 12) and ModelIdentifierFactory (900 on FIG. 13), and delegates client requests to the appropriate one. Implementations of IModel that do not understand a particular entity identifier are expected to invoke IHandleModelService, thereby allowing third parties to extend them.

Figure 12:
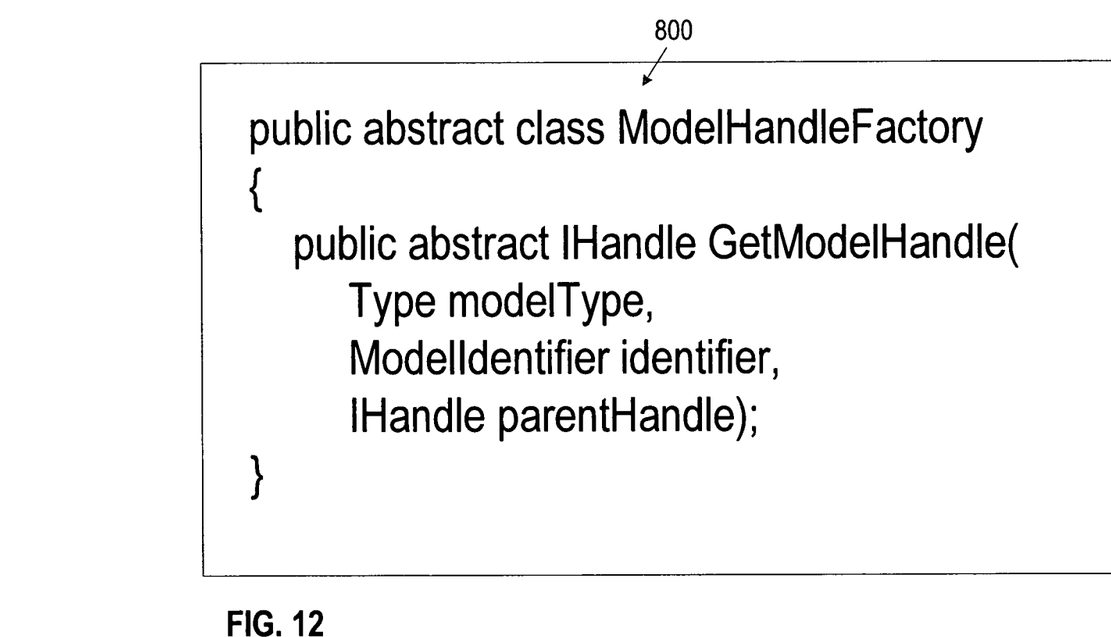
FIG. 12 is a diagram illustrating a ModelHandleFactory type abstract class of one implementation.

FIG. 12 is a diagram illustrating a ModelHandleFactory type abstract class 800 of one implementation. The ModelHandleFactory type 800 permits third parties to extend the set of entity identifiers supported by a particular object model. Examples of metadata provided by each ModelHandleFactory includes:

- The type of IModel it can produce
- The type of ModelIdentifier it will accept
- The type of IModel it requires for context
- A model "tag" that uniquely identifies a particular implementation of the context IModel The IHandleModelService implementation aggregates all ModelHandleFactory instances. When it receives a request for a model handle, it chooses the appropriate one based on the metadata listed above. It then delegates control to this factory to produce the requested model handle.

Figure 13:
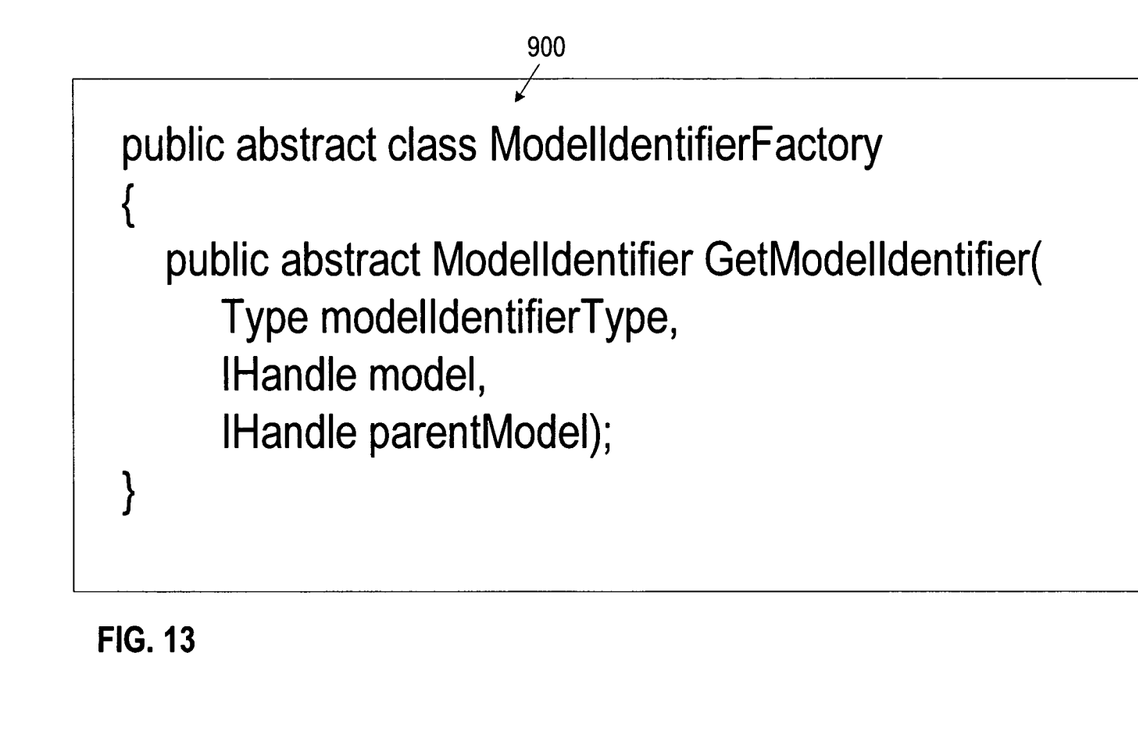
FIG. 13 is a diagram illustrating a ModelIdentifierFactory type abstract class of one implementation.

FIG. 13 is a diagram illustrating a ModelIdentifierFactory type abstract class 900 of one implementation. The ModelIdentifierFactory type 900 permits third parties to extend the set of entity identifiers supported by a particular domain model. Examples of metadata provided by each ModelIdentifierFactory include:

- The type of ModelIdentifier it can produce
- The type of IModel for which it can produce this ModelIdentifier
- The type of IModel it requires for context
- A model "tag" that uniquely identifies a particular implementation of the context IModel The IHandleModelService implementation aggregates all ModelIdentifierFactory instances. When it receives a request for an entity identifier, it chooses the appropriate one based on the metadata listed above. It then delegates control to this factory to produce the requested entity identifier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for providing a framework that enables correlation of conceptually similar entities, comprising:
    providing a framework with a common set of domain-specific entity identifier types that a plurality of object models representing conceptually similar entities from a single domain can use to correlate to model-specific object instances, the model-specific object instances including object instances obtained from specific model instances, each domain-specific entity identifier type of the common set being implemented in an abstract class and describing a corresponding conceptual entity in the single domain;
    providing one or more extensibility mechanisms to allow third parties to extend the common set of domain-specific entity identifier types;
    receiving a request associated with the one or more extensibility mechanisms for at least one of a model handle or an entity identifier from a third party of the third parties;
    enabling a particular model-specific object instance of a particular one of the object models to be retrieved using the common set of domain-specific entity identifier types; and
    enabling an instance of a particular domain-specific entity identifier type to be retrieved from a corresponding one of the model-specific object instances.

2. The method of claim 1, wherein the domain-specific entity identifier types can be either unique or non-unique identifiers.

3. The method of claim 1, wherein the framework provides a common set of abstractions and interfaces for creating the object models with the domain-specific entity identifier types.

4. The method of claim 1, wherein domain-specific entity identifier types are provided through public classes.

5. The method of claim 1, wherein the correlation using the domain-specific entity identifier types is independent of one or more types of the model-specific object instances.

6. The method of claim 1, wherein the domain-specific entity identifier types derive from a common abstract base class.

7. The method of claim 1, wherein the domain-specific entity identifier types contain only simple data types.

8. The method of claim 1, wherein the domain-specific entity identifier types can be serialized and de-serialized.

9. The method of claim 1,
    wherein the common set of domain-specific entity identifier types is extended by allowing one or more model-specific object instances to be provided for one or more domain-specific entity identifier types that a particular one or more of the object models did not originally support.

10. A computer-readable storage device having computer-executable instructions for causing a computer to perform steps comprising:
    provide a framework with a common set of domain-specific entity identifier types that a plurality of object models representing a conceptually similar entity from a single domain can use to correlate model-specific object instances, the model-specific object instances including object instances obtained from specific model instances, each domain-specific entity identifier type of the common set being implemented in an abstract class and describing a corresponding conceptual entity in the single domain; and
    provide one or more extensibility mechanisms to allow third parties to extend the common set of domain-specific entity identifier types, at least one of the one or more extensibility mechanisms configured to receive a request from a third party of the third parties via a user interface, and configured to validate the request based on a list of known extensions related to the common set of domain-specific entity identifier types.

11. The computer-readable storage device of claim 10, wherein the domain-specific entity identifier types are operable to be extended by allowing one or more model-specific object instances to be provided for one or more domain-specific entity identifier types that a particular one or more of the object models did not originally support.

12. The computer-readable storage device of claim 10, wherein the domain-specific entity identifier types are operable to be extended by allowing one or more domain-specific entity identifier types to be provided for model-specific object instances that a particular one or more of the object models did not originally support.

13. A method for providing an application programming interface for allowing correlation of conceptually similar entities, comprising:

providing an application programming interface with an abstract entity identifier class, with domain-specific entity identifier types being required to derive from the abstract entity identifier class, thereby allowing a plurality of object models representing a conceptually similar entity from a single domain to use the domain-specific entity identifier types to correlate model-specific object instances, the model-specific object instances including object instances obtained from specific model instances, each domain-specific entity identifier type being implemented in an abstract class and describing a corresponding conceptual entity in the single domain; and providing one or more extensibility mechanisms to allow third parties to extend a set of domain-specific entity identifier types, based on a list of known extensions, that a particular one or more of the plurality of object models did not originally support.

14. The method of claim 13, wherein the application programming interface can be applied to an object model.

15. The method of claim 14, wherein the object model is allowed to be either a root object model or a sub object model.

16. The method of claim 14, wherein the object model implements a method to retrieve one or more of the domain-specific entity identifier types.

17. The method of claim 14, wherein the object model implements a method to retrieve one or more sub object models using one or more of the domain-specific entity identifier types.

18. The method of claim 13, wherein the application programming interface further comprises an object handle interface.

19. The method of claim 18, wherein the object handle interface implements a method for accessing one or more of the model-specific object instances.

20. The method of claim 13,
wherein the domain-specific entity identifier types are operable to be extended by allowing one or more model-specific object instances to be provided for one or more domain-specific entity identifier types or by allowing one or more domain-specific entity identifier types to be provided for model-specific object instances.

* * * * *